(12) United States Patent
Adachi

(10) Patent No.: US 6,572,139 B2
(45) Date of Patent: Jun. 3, 2003

(54) OCCUPANT SENSOR AND AIRBAG CONTROL APPARATUS

(75) Inventor: Izumi Adachi, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/864,159

(22) Filed: May 25, 2001

(65) Prior Publication Data
US 2001/0035636 A1 Nov. 1, 2001

Related U.S. Application Data

(63) Continuation-in-part of application No. PCT/JP99/06612, filed on Nov. 26, 1999.

(30) Foreign Application Priority Data

Nov. 27, 1998 (JP) ............................................ 10-337891

(51) Int. Cl.$^7$ ................................................ B60R 21/32
(52) U.S. Cl. ...................... 280/735; 250/221; 340/556
(58) Field of Search ......................... 280/735; 250/221, 250/222.1, 559.38; 340/555, 556, 573.7; 701/45

(56) References Cited

U.S. PATENT DOCUMENTS

| | | | | |
|---|---|---|---|---|
| 5,490,069 A | * | 2/1996 | Gioutsos et al. | 701/45 |
| 5,585,625 A | * | 12/1996 | Spies | 250/221 |
| 5,737,083 A | * | 4/1998 | Owechko et al. | 356/623 |
| 5,988,676 A | * | 11/1999 | Lotito et al. | 280/735 |
| 6,027,138 A | * | 2/2000 | Tanaka et al. | 280/735 |
| 6,113,137 A | * | 9/2000 | Mizutani et al. | 280/735 |
| 6,236,035 B1 | * | 5/2001 | Saar et al. | 250/221 |
| 6,298,311 B1 | * | 10/2001 | Griffin et al. | 702/150 |
| 6,313,739 B1 | * | 11/2001 | Roth et al. | 340/426 |
| 6,323,487 B1 | * | 11/2001 | Wu | 250/341.1 |
| 6,428,171 B1 | * | 8/2002 | Aoki | 250/559.38 |

FOREIGN PATENT DOCUMENTS

| | | | |
|---|---|---|---|
| JP | 405218487 A | * | 8/1993 |
| JP | 7-218336 | | 8/1995 |
| JP | 10-100854 | | 4/1998 |
| JP | 10-100858 | | 4/1998 |
| JP | 10-119710 | | 5/1998 |
| JP | 10-147206 | | 6/1998 |
| JP | 10-157561 | | 6/1998 |
| JP | 10-157563 | | 6/1998 |
| JP | 10-250450 | | 9/1998 |
| WO | WO98/51993 | * | 11/1998 |

* cited by examiner

*Primary Examiner*—Paul N. Dickson
*Assistant Examiner*—David R. Dunn
(74) *Attorney, Agent, or Firm*—Morgan, Lewis & Bockius LLP

(57) ABSTRACT

An occupant sensor has a photodetective portion having a photosensitive surface capable of receiving a reflection R of a light curtain (two-dimensional light) projected from a light projecting portion. Masks cover part of the photosensitive surface. The apparatus can quickly detect presence/absence of an occupant, because the masks block entry of unwanted light. Control of an airbag is carried out based on the presence/absence of occupant.

9 Claims, 12 Drawing Sheets

OCCUPANT SENSOR AND AIRBAG CONTROL APPARATUS

RELATED APPLICATION

This is a continuation-in-part application of application Ser. No. PCT/JP99/06612 filed on Nov. 26, 1999.

BACKGROUND OF THE INVENTION

1. Field of the Invention

The present invention relates to an occupant sensor used in an airbag system for protecting a vehicle occupant and an airbag control apparatus provided therewith.

2. Related Background Art

Vehicles equipped with the airbag system for protecting the occupant in the event of a collision have quickly been increasing in recent years. This airbag system is constructed to store an airbag in a steering wheel on the driver side or in a dash board on the passenger side and protect the occupant by instantaneously inflating the airbag upon collision of an automobile. There has been the desire to measure the position of the occupant upon expansion of the airbag in order to implement more sophisticated airbag control.

Techniques using the triangulation have been developed heretofore for this desire. For example, there are a vehicle control system described in Japanese Patent Application Laid-Open No. H10-157563 and an occupant detecting system described in Japanese Patent Application Laid-Open No. 10-100858.

The vehicle control system described in the application Laid-Open No. H10-157563 is constructed to emit beams from nine LEDs into different directions and determine whether an object exists in the direction of emission of each beam, based on intensity of reflection of the beam. Then the system is configured to disable operation of an airbag driving circuit when it is determined that an object over a predetermined size exists in an airbag expansion area. This system is able to determine whether an object of predetermined size exists, for example, in the space between the front passenger seat and the dashboard. The vehicle control system described in the above application, however, has the problem that it takes a long time for the judgment on presence/absence of object, for example.

The occupant detecting system described in the above application No. H10-100858 is provided with an LED as a beam outputting means and a PSD (position sensitive detector) as a photo detector and is constructed to detect whether an object (occupant) exists in an area (alarm area) where inflation of the airbag is not optimal for the occupant, according to output of the PSD. This system is able to determine whether an object exists in the watching area.

As a technique using the triangulation there is an optical object detecting sensor described in Japanese Patent Application Laid-Open No. H07-218336. It is conceivable to apply this sensor to a vehicle and utilize it as an occupant sensor, but this sensor is designed to measure the distance from a light-emitting element to all objects existing in the traveling direction of light emitted from the light-emitting element. For that reason, the sensor will measure the distance to the object even if the light is reflected, for example, by an occupant's leg seated in an appropriate state on the passenger seat, i.e., even if the object exists in a region expected not to measure.

SUMMARY OF THE INVENTION

The present invention has been accomplished under such circumstances and an object of the invention is to provide an occupant sensor and an airbag control apparatus capable of quickly detecting presence/absence of only an object existing in a watching region.

An occupant sensor according to the present invention comprises a light projecting portion for forming a light curtain for detection of occupant in a space between a seat and an airbag housing, a photodetective (receiving) portion for a reflection of the light curtain reflected by an occupant, and a mask disposed in the photodetective portion and having an aperture for letting the reflection enter only a part of the photodetective portion.

More preferably, an occupant sensor according to the present invention is an occupant sensor for detecting existence of an object in a predetermined two-dimensional area of an airbag expanding region in a vehicle, which comprises a light projecting portion for projecting two-dimensional light (a light curtain) including the two-dimensional area, into directions of a spread of the two-dimensional area, a photodetective portion having a photosensitive surface capable of receiving a reflection of the two-dimensional light, and a mask covering at least a portion of the photosensitive surface and having an entrance port which light can enter, wherein the mask covers the photosensitive surface so that only when an object exists in the two-dimensional area, a reflection from the object enters the entrance port.

In this occupant sensor, when the two-dimensional light emitted from the light projecting portion reaches an object, a reflection of the two-dimensional light reflected by the object travels toward the photodetective portion, for example, consisting of a photodiode or the like.

The two-dimensional light is projected so as to embrace the two-dimensional area, into the directions of a spread of the predetermined two-dimensional area of the airbag expanding region, and only when an object exists in the two-dimensional area, a reflection there from enters the entrance port of the mask covering the photosensitive surface of the photodetective portion. Therefore, the photodetective portion detects the reflection only when the occupant or the like exists in the watching area. Thus the sensor does not have to make a judgment when the object exists in the region causing no influence on the expanding operation of the airbag.

The two-dimensional area herein means a flat area of a quadrate, a trapezoid, a circle, or the like located, for example, in the space between the driver's head and the center of an airbag cover provided in the steering wheel housing the airbag or in the space between the occupant's head and the center of an airbag cover on the front passenger side.

The light projected from the light projecting portion is two-dimensional light having a predetermined spread in the width direction or two-dimensional light consisting of an array of beams, and thus existence of the object can be quickly detected, when compared with a case wherein a plurality of light projecting means are provided to sequentially project their respective beams.

Since the existence of the object in the two-dimensional area can be detected simply by incidence of the reflection of the two-dimensional light into the entrance port of the mask, a judgment can be readily made on presence/absence of object.

In the occupant sensor, the light projecting portion is desirably constructed to comprise output means, for example, such as an LED or the like, for outputting light, and a cylindrical lens for widening the output light into a predetermined width to obtain the two-dimensional light.

The sensor is also desirably constructed so that there exist a plurality of two-dimensional areas in the vehicle, the light projecting portion projects a plurality of two-dimensional light beams corresponding to the respective two-dimensional areas, and the photodetective portion has a plurality of photosensitive surfaces capable of respectively receiving reflections of the two-dimensional light beams. When this structure is employed, it becomes feasible to make judgments on presence/absence of object in a plurality of areas in the airbag expanding region, whereby the detection of the object can be performed more accurately.

It is also desirable that the photodetective portion have a plurality of photosensitive surfaces arrayed in the width direction of the two-dimensional light. For example, supposing n photosensitive surfaces are provided in the width direction of the two-dimensional light, i.e., in the direction nearly perpendicular to the traveling direction of the two-dimensional light and n small areas are assumed by dividing the two-dimensional area in the width direction of the two-dimensional light, a reflection in each small area can enter a corresponding photosensitive surface.

Then the size of an object existing in the two-dimensional area is determined depending upon the number and positions of photosensitive surfaces receiving respective reflections.

Further, the sensor is desirably constructed to further comprise a second light projecting portion for projecting low directional light with lower directivity than the two-dimensional light projected from the light projecting portion and arranged so that only when an object exists in the two-dimensional area, a reflection of the low directional light reflected by the object can enter the entrance port.

If the spacing is too narrow between the light projecting portion and the two-dimensional area, there can occur cases wherein the reflection of the two-dimensional light from the object cannot enter the entrance port though the object exists in the two-dimensional area.

In such cases, when the low directional light with lower directivity than the two-dimensional light, i.e., the low directional light with a wide spread angle is projected toward the two-dimensional area, the reflection of the low directional light from the object can enter the entrance port even if the two-dimensional area is present in a space relatively close to the light projecting portion.

An airbag control apparatus according to the present invention comprises the above occupant sensor, and a control portion for disabling expansion of the airbag when a reflection enters the entrance port of the photosensitive surface of the occupant sensor.

In the airbag control apparatus, when the occupant sensor detects existence of an object in the two-dimensional area, the control portion performs control to disable expansion of the airbag. Therefore, the expanding operation of the airbag is prevented, for example, when a child is standing in the watching two-dimensional area in the airbag expanding region, even upon collision of the vehicle.

DESCRIPTION OF THE PREFFERED EMBODIMENT

Preferred embodiments of the occupant sensor and the airbag control apparatus according to the present invention will be described hereinafter in detail with reference to the accompanying drawings. The same elements will be denoted by the same reference symbols and redundant description will be omitted.

(First Embodiment)

First, the first embodiment of the present invention will be described referring to FIG. 1 to FIG. 3.

Figure 1:
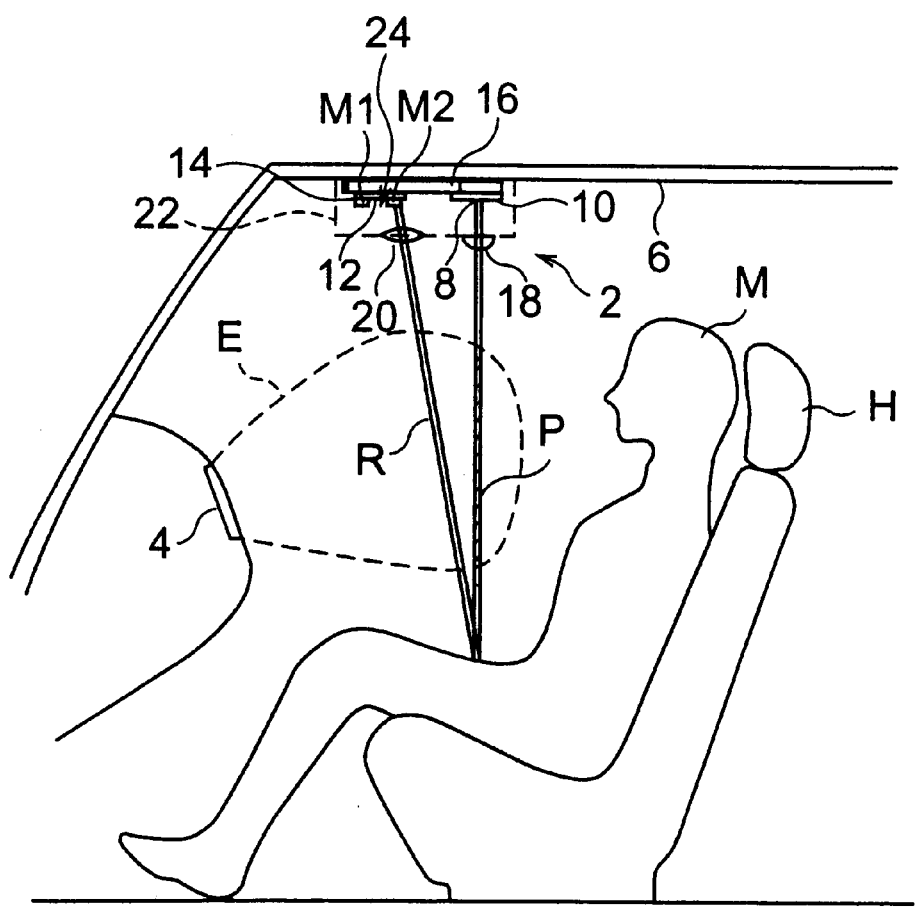
FIG. 1 is a diagram to show a state of application in which the occupant sensor of the first embodiment is applied to the front passenger side of an automobile.
Figure 2:
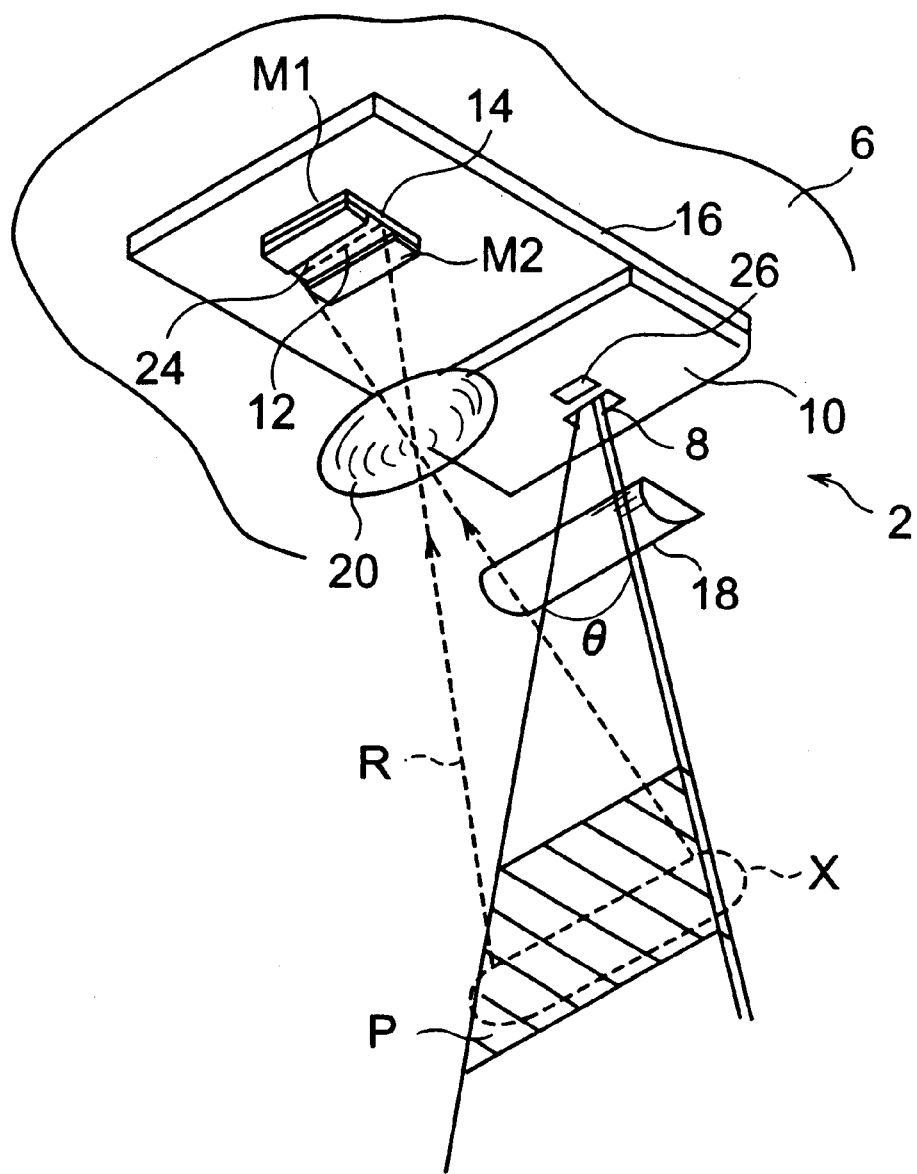
FIG. 2 is an enlarged perspective view of the occupant sensor of the first embodiment.

FIG. 1 is a diagram to show a state of application in which the occupant sensor 2 of the present embodiment is applied to the front passenger side of an automobile, and FIG. 2 is an enlarged perspective view of the occupant sensor 2. The occupant sensor 2 of the present embodiment is a sensor for determining whether an object exists in a two-dimensional (2D) area P included in an airbag expansion area E indicated by a dotted line in FIG. 1, by so-called triangulation. The 2D area is the hatched area in FIG. 1 and FIG. 2, which is located so as to extend approximately in the vertical direction in the space between an airbag cover or airbag housing 4 and the head of occupant M or a headrest (seat) E.

As illustrated in FIG. 2, the shape of the 2D area in a view from the front of the vehicle is approximately trapezoid. The occupant sensor 2 is mounted in a ceiling portion 6 of the car and is mainly comprised of a light projecting portion 10 provided with an LED 8 as an output means, a photodetective portion 14 provided with a photodiode 12, and a base portion 16 for fixing the light projecting portion 10 and the photodetective portion 14 with a predetermined spacing in between.

A cylindrical lens 18, which converts light emitted from the LED 8, to two-dimensional light (hereinafter referred to as "2D light") by expanding the width thereof to a predetermined width, is disposed below the LED 8, and a condenser lens 20, which condenses a reflection R of the 2D light reflected by the occupant or the seat, is disposed below the photodiode 12. A monitoring PD (photodiode) 26 for monitoring that the LED 8 is emitting light, is located in the vicinity of the LED 8.

The cylindrical lens 18 and condenser lens 20 are attached to a cover 22 covering the base portion 16 (see FIG. 1), but the cover 22 is omitted from the illustration of FIG. 2.

The front end and rear end of the photodiode 12 are covered by masks M1, M2, which are a feature of the present embodiment. The masks M1, M2 are shield films of aluminum and thus are arranged so as to permit only the reflection R of the 2D light entering the entrance port 24 between the mask M1 and the mask M2 to reach the photosensitive surface of the photodiode 12.

The output light from the LED 8 travels approximately in the vertical direction and is expanded in the direction of the cylinder axis of the cylindrical lens 18 so as to become the 2D light including the 2D area P. On this occasion, the spread angle θ of the 2D light is desirably set in the range of approximately 50° to approximately 90°. The thickness of the 2D light is desirably not more than approximately 20 mm.

When there exists no object in the 2D area P, the 2D light is reflected by the legs or the like of the occupant normally seated on the seat and the reflection R of the 2D light traveling toward the photodetective portion 14 is condensed by the condenser lens 20 to reach the mask M2, as: illustrated in FIG. 1. Namely, the reflection R of the 2D light is unable to enter the photosensitive surface of the photodiode 12.

In contrast with it, when an object exists in the 2D area P (for example, with the object X illustrated in FIG. 2), the reflection R from the object X is condensed by the condenser lens 20 and thereafter passes through the entrance port 24 to enter the photosensitive surface of the photodiode 12, as illustrated in FIG. 2. When the object exists above the 2D area P, the reflection R from the object is condensed by the condenser lens 20 and thereafter reaches the mask M1.

Namely, the masks M1, M2 are attached to the photodetective portion 14 so that the reflection R of the 2D light enters the entrance port 24 only when the object exists in the 2D area P.

Figure 3:
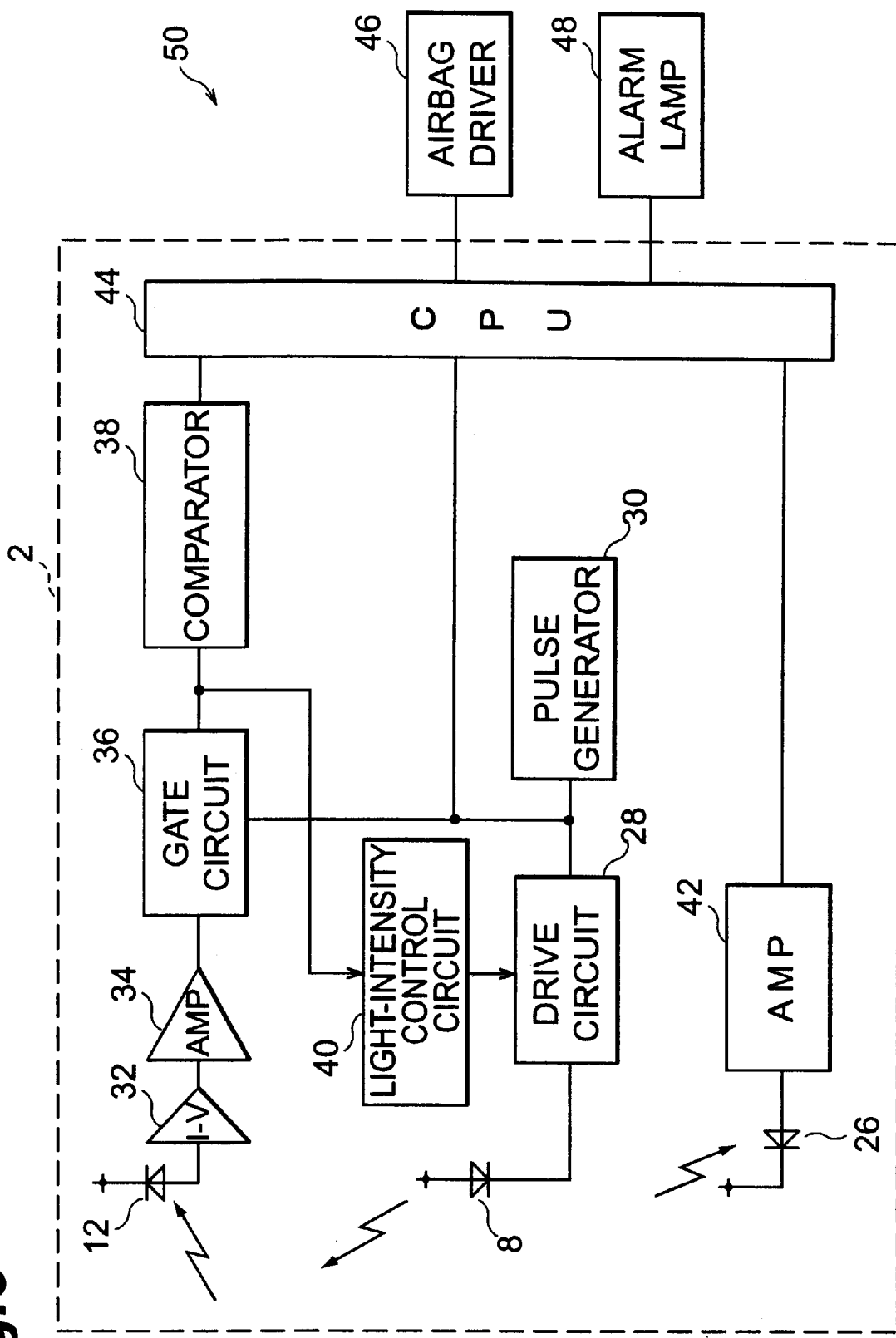
FIG. 3 is a diagram to show an electronic circuit in the occupant sensor and the airbag control apparatus of the first embodiment.

FIG. 3 is a diagram to show an electronic circuit in the occupant sensor 2 and the airbag control apparatus 50 of the present embodiment. As shown in this circuit, a drive circuit 28 for sending an emission command to the LED 8 is connected to the LED 8 and a pulse generating circuit 30 for generating a pulse signal is connected to the drive circuit 28.

On the other hand, connected in the order named below to the photodiode 12 for the reflection R of the 2D light are a current-voltage converter 32 for converting an electric current flowing upon photoelectric conversion by the photodiode 12, to a voltage signal, an amplifier 34 for amplifying an output signal from the current-voltage converter 32, a gate circuit 36 for letting an output signal of the amplifier 34 pass only when it receives the pulse signal from the pulse generating circuit 30, and a comparator 38 for comparing the output signal of the amplifier 34 after passage through the gate circuit 36, with a predetermined reference voltage.

Connected to the output terminal of the gate circuit 36 is a light-intensity control circuit 40, which outputs a control signal for controlling the intensity of light from the LED 8 according to the output signal from the photodiode 12, to the drive circuit 28. The drive circuit 28 determines the intensity of emission of the LED 8 in response to a command from the light-intensity control circuit 40. Since the pulse generator 30 simultaneously sends the pulse signal to the drive circuit 28 and to the gate circuit 36, the emission of the LED 8 and the opening operation of the gate circuit 36 are carried out at the same time.

An amplifier 42 is connected to the monitoring PD 26 for monitoring that the LED 8 is emitting light.

Further, the comparator 38, pulse generator 30, and amplifier 42 are connected to a CPU (central processing unit) 44 for carrying out various arithmetic processes.

The above described the setup of the electronic circuit of the occupant sensor 2.

Connected to the CPU 44 are an airbag driving circuit 46 for sending an expansion command or the like to the airbag and an alarm lamp 48 which lights up when the LED 8 does not emit. The airbag control apparatus 50 is composed of the occupant sensor 2 and the airbag driving circuit (control section) 46.

Next, the action of the occupant sensor 2 and the airbag driving circuit 50 will be described referring to FIG. 3 and FIG. 2. When the CPU 44 sends a drive command to the pulse generator 30, the pulse generator 30 sends the pulse signal to the drive circuit 28 and to the gate circuit 36, whereupon the LED 8 emits pulsed light. Then the light is projected as the 2D light beam, as illustrated in FIG. 2, and thereafter it is reflected by the seat or the occupant to travel as the reflection R toward the photodetective portion 14.

When an object (for example, part of the occupant's body) exists in the 2D area P, as described above, the reflection R of the 2D light reflected by the object passes through the entrance port 24 to enter the photodiode 12. When the reflection R is incident to the photodiode 12, an electric current flows in the photodiode 12 and a value of this electric current is converted into a voltage signal by the current-voltage converter 32. After that, the voltage signal is amplified by the amplifier 34 and the amplified signal arrives at the gate circuit 36.

Since the gate circuit 36 is also opened at the same time as the emission of the LED 8 as described above, the output signal from the amplifier 34 is able to reach the comparator 38. The output signal from the amplifier 34 is compared with the reference voltage in the comparator 38. When the output is larger than the reference voltage, the comparator 38 outputs a signal of a high level.

On the other hand, when the output signal from the amplifier 34 is smaller than the reference voltage, the signal is recognized as noise and the comparator 38 outputs a signal of a low level. When receiving the signal of the high level, the CPU 44 then sends an expansion inhibition command to the airbag driving circuit 46. Thus the airbag is inhibited from expanding even in the event of a collision of the car.

On the other hand, when no object exists in the 2D area P on the occasion of emission of the pulsed light from the LED 8, the reflection R of the 2D light does not enter the photodiode 12, so that the CPU 44 does not receive the signal of the high level. At this time, the CPU 44 does not send the expansion inhibition command to the airbag driving circuit 46, so that the airbag is in an expandable state is the event of a collision of the car.

When the CPU 44 does not receive the signal from the monitoring PD 26 after having sent the drive command to the pulse generating circuit 30, the CPU 44 determines that the pulse generator 30, the drive circuit 28, or the LED 8 suffered failure, and then lights the alarm lamp 48.

As described above, the occupant sensor 2 of the present embodiment is arranged so that the photodiode 12 is illuminated by the reflection R of the 2D light only when the occupant or the like exists in the watching 2D area P, whereby the sensor does not have to determine whether the object is present in the region causing no influence on the expanding operation of the airbag. Since the output light from the light projecting portion 10 is the 2D light with the predetermined spread in the width direction, the existence of object can be quickly detected, as compared with a case wherein many LEDs are sequentially activated.

Further, since the existence of the object in the 2D area P can be detected simply by incidence of the reflection R of the 2D light into the entrance port 24 between the masks M1, M2, a judgment can be readily made on presence/absence of the object.

(Second Embodiment)

Figure 4:
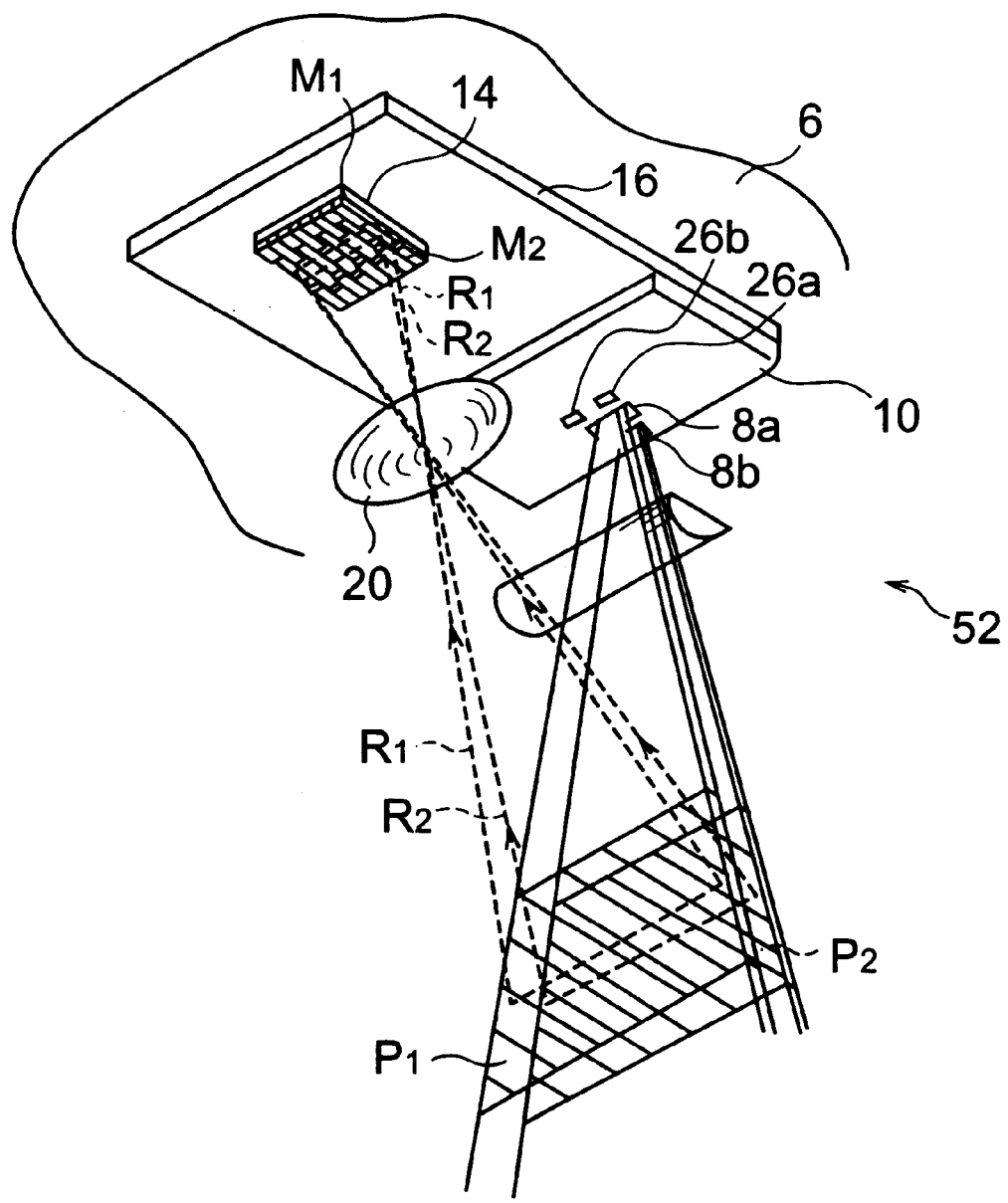
FIG. 4 is an enlarged perspective view of the occupant sensor of the second embodiment.
Figure 5:
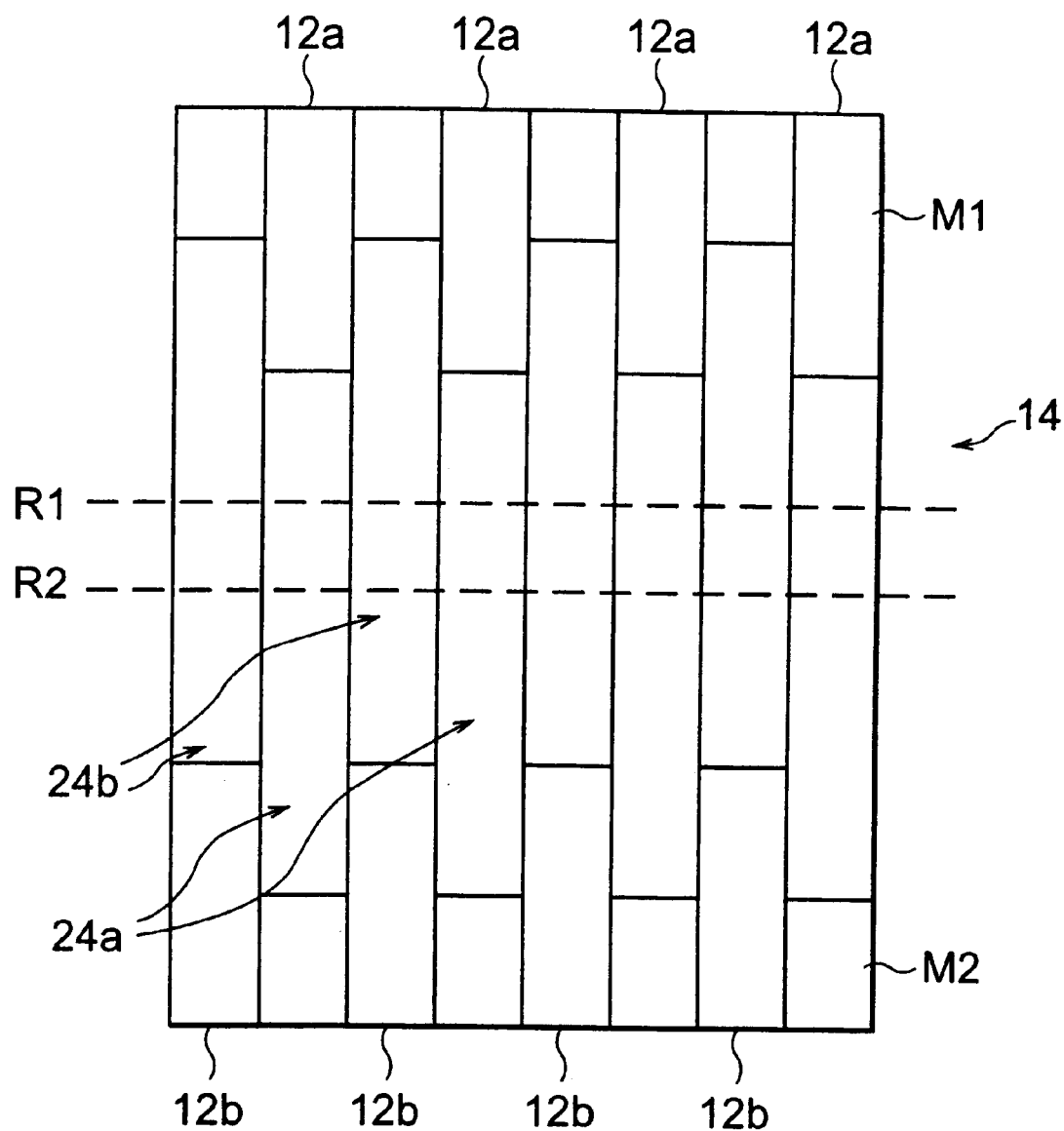
FIG. 5 is a plan view of the photodetective portion mounted in the occupant sensor of the second embodiment.
Figure 6:
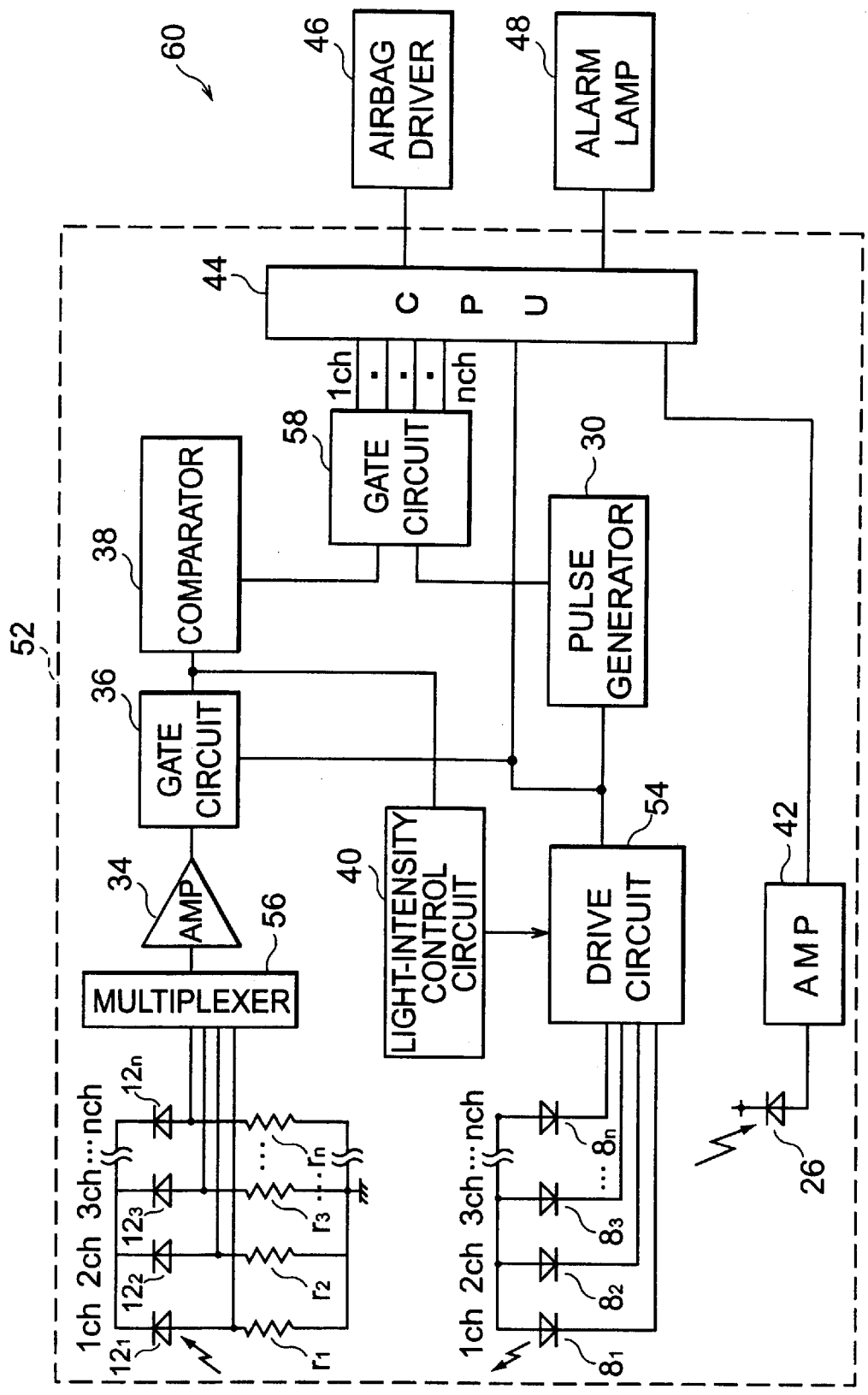
FIG. 6 is a diagram to show an electronic circuit of a system as an n(ch) circuit provided with n LEDs and n photodiodes, in the occupant sensor and the airbag control apparatus of the second embodiment.

The second embodiment of the present invention will be next described referring to FIG. 4 to FIG. 6. FIG. 4 is an enlarged perspective view of the occupant sensor 52 of the present embodiment and FIG. 5 a plan view of the photodetective portion 14 mounted in the occupant sensor.

Unlike the first embodiment, the occupant sensor 52 is provided with two LEDs 8a, 8b which are spaced with a predetermined spacing in the longitudinal direction of the car and which alternately emit. Namely, two 2D light beams are emitted, whereby it becomes feasible to detect the object in two 2D areas P1, P2.

Since the LEDs 8a, 8b are spaced with the predetermined spacing, reflections R1, R2 from objects existing in the respective 2D areas P1, P2 will be incident to different positions of the photodetective portion 14, as illustrated in FIG. 5, even if the objects existing in the respective 2D areas P1, P2 are located at the same height in the car. For that reason, the photodetective portion 14 of the present embodiment is equipped with photodiodes 12a for the reflection R1 and photodiodes 12b for the reflection R2.

The photodiodes 12a and photodiodes 12b are alternately arranged four each.

The upper side of FIG. 5 corresponds to the front of the car and the reflection R2 of the LED 8b located on the rear side of the car with respect to the LED 8a is converged at a position in front of the reflection R1. Therefore, entrance ports 24b made by the masks M1, M2 covering the photodiodes 12b for the reflection R2 are arranged so as to be located closer to the front end of the car than entrance ports 24a for the photodiodes 12a. This enables the 2D areas P1, P2 to correspond to the entrance ports 24a, 24b.

The light projecting portion 10 is provided with monitoring PDs 26a, 26b for monitoring emission of the respective LEDs 8a, 8b. This enables the sensor to determine whether each LED 8a, 8b is emitting. It is, however, noted that the monitoring PDs do not always have to be provided in the same number as the number of LEDs and that it is also possible to construct the sensor so that one monitoring PD monitors emission of all the LEDs.

FIG. 6 is a diagram to show a configuration in which the electronic circuit in the occupant sensor 52 and the airbag control apparatus 60 of the present embodiment is constructed as an n(ch) circuit with n LEDs and n photodiodes.

The pulse generating circuit 30 outputs a synchronous pulse signal to the drive circuit 54 and to the gate circuit 36, and the drive circuit 54 receiving the pulse signal sequentially activates the LEDs $8_1$ to $8_n$ in synchronism with the pulse signal.

An output beam from each LED $8_1$ to $8_n$ is reflected by the object existing in the 2D area $P_1$ to $P_n$ to become a reflection $R_1$ to $R_n$ and thereafter enters the photodiode $12_1$ to $12_n$ corresponding to the LED $8_1$ to $8_n$. When the reflection enters the photodiode $12_1$ to $12_n$, the value of current flowing from the photodiode $12_1$ to $12_n$ is converted through a resistor $r_1$ to $r_n$ into a voltage value and a multiplexer 56 selects the output value from the photodiode corresponding to the activated LED.

The output selected by the multiplexer 56 is amplified by the amplifier 34 and thereafter is guided through the gate circuit 36 and comparator 38 to a gate circuit 58. This gate circuit 58 is configured to sequentially open lines for 1 ch to n ch in synchronism with the pulse signal from the pulse generator 30. When the signal of the high level from the comparator 38 reaches the CPU 44 through the gate circuit 58 and either one line of 1 ch to n ch, the CPU 44 determines that an object exists in the 2D area corresponding to that channel.

This processing is carried out by sequentially emitting the LEDs $8_1$ to $8_n$, whereby the CPU can judge presence/absence of object in all the 2D areas $P_1$ to $P_n$. Then the CPU 44 can be configured to send an expansion inhibition command to the airbag driving circuit 46, for example, only when there exist objects in all the 2D areas $P_1$ to $P_n$ or when there exist objects in a predetermined number of areas out of the 2D areas $P_1$ to $P_n$.

As described above, the occupant sensor 52 of the present embodiment is able to make a judgment on presence/absence of object in the plurality of 2D areas, so that it can perform the detection of object more accurately.

(Third Embodiment)

Figure 7:
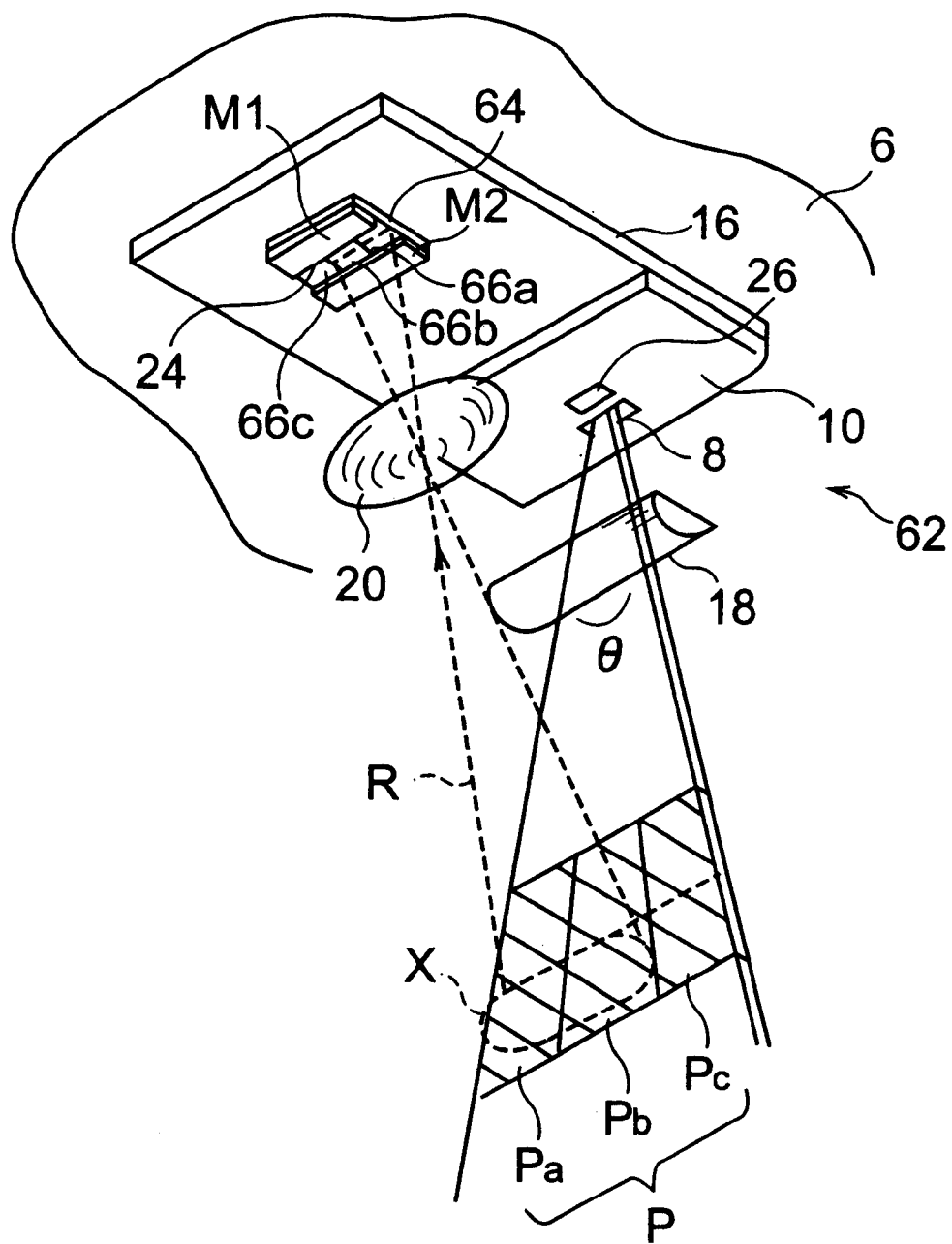
FIG. 7 is an enlarged perspective view of the occupant sensor of the third embodiment.
Figure 8:
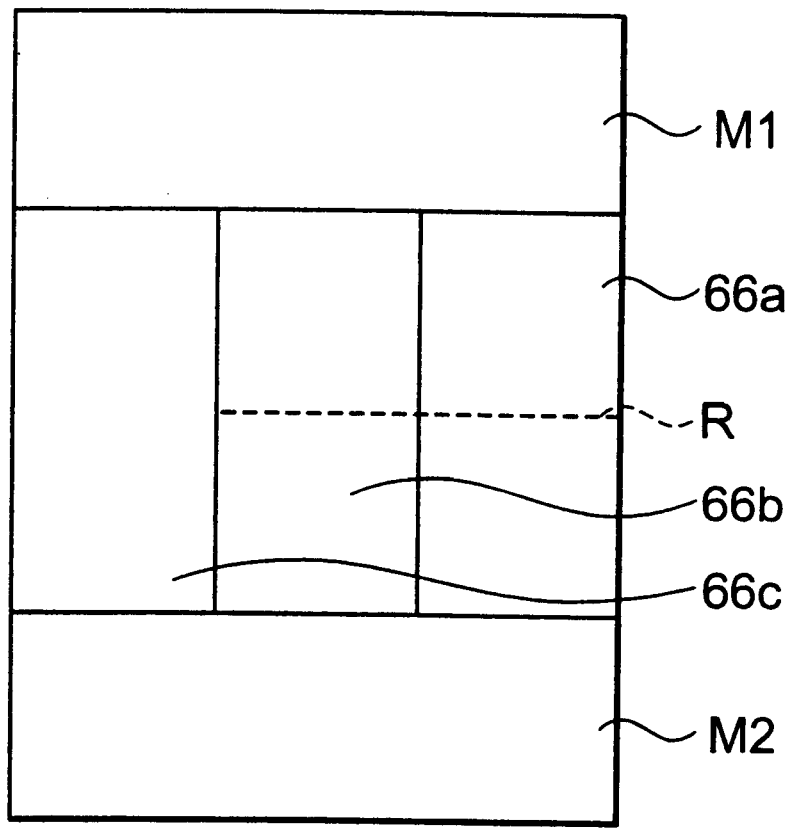
FIG. 8 is a plan view of the photodetective portion mounted in the occupant sensor of the third embodiment.

The third embodiment of the present invention will be next described referring to FIG. 7 and FIG. 8.

FIG. 7 is a perspective view of the occupant sensor 62 of the present embodiment and FIG. 8 a plan view of the photodetective portion 64, which is a feature of the present embodiment. As illustrated in FIG. 7 and FIG. 8, the photodetective portion is provided with three photodiodes 65a to 66c of equal size arrayed in the width direction of the 2D light beam.

In this structure, assuming that the 2D area P is divided into three small areas Pa to Pc in the width direction of the 2D light, the reflection R from the small areas Pa to Pc will enter the photodiodes 66a to 66c corresponding to the respective areas.

For example, supposing an object X exists only in the small area Pa and the small area Pb of the 2D area P, as illustrated in FIG. 7, the reflection R will be condensed by the condenser lens 20 and thereafter enter only the photodiode 66a and photodiode 66b.

In other words, flow of photocurrents in the photodiode 66a and photodiode 66b indicates existence of some object in the small area Pa and the small area Pb. Then the unrepresented CPU of the occupant sensor can be configured to send an airbag expansion inhibition command to the airbag driving circuit, for example, only when it determines that an object exists in two or more small areas.

In this case, the airbag does not expand, for example, when the occupant's head is in the 2D area P across two or more small areas. However, the airbag is expandable in the event of a collision of the car when the occupant's hand is in only one small area.

Namely, the present embodiment allows the sensor to determine the size of the object existing in the 2D area P according to the number of photodiodes 66a to 66c illuminated by the reflection R. The number of photodiodes placed in the photodetective portion 64 does not have to be limited to 3, but can be set to either of various numbers.

(Fourth Embodiment)

Figure 9:
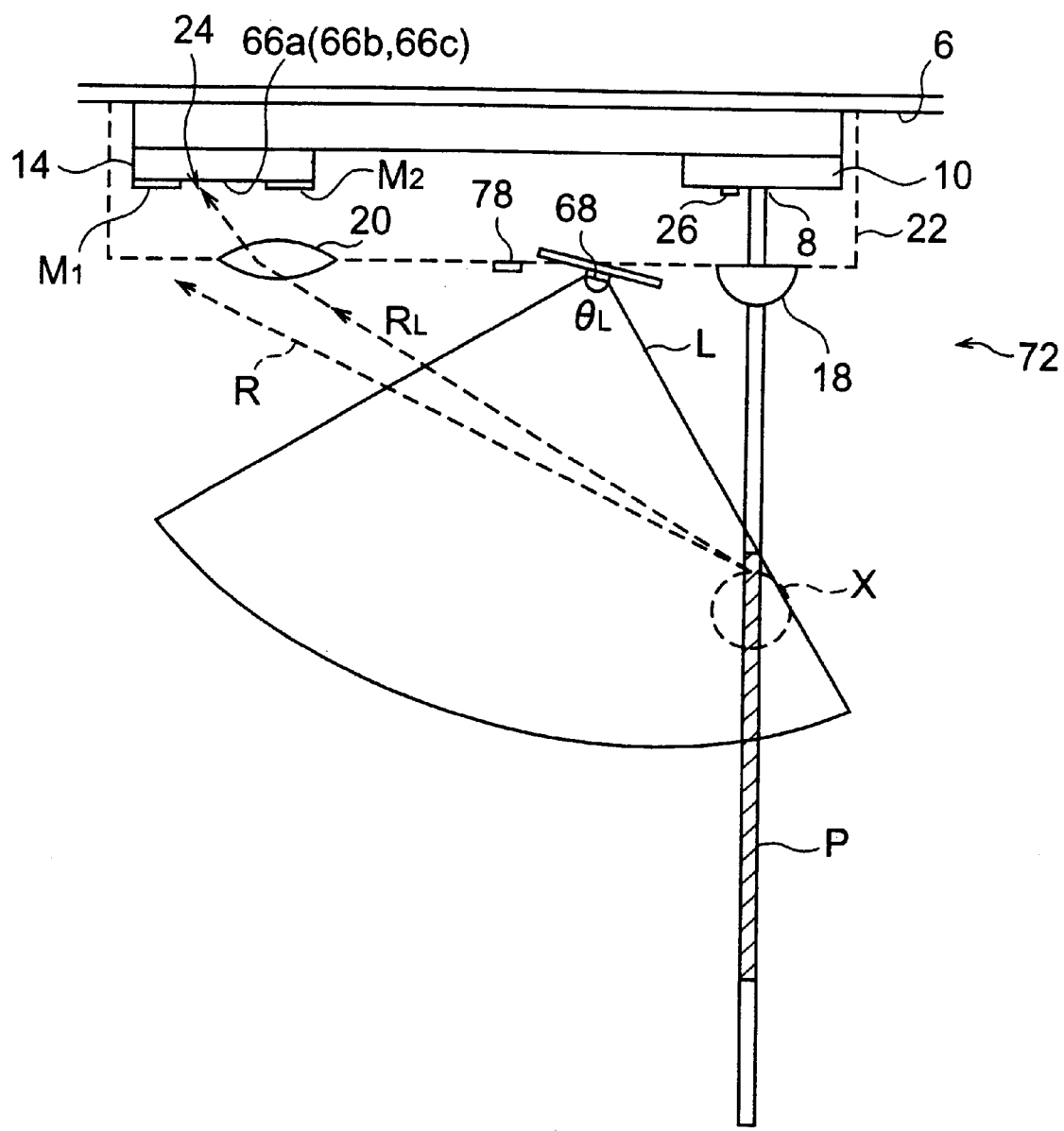
FIG. 9 is a side view of the occupant sensor of the fourth embodiment.
Figure 10:
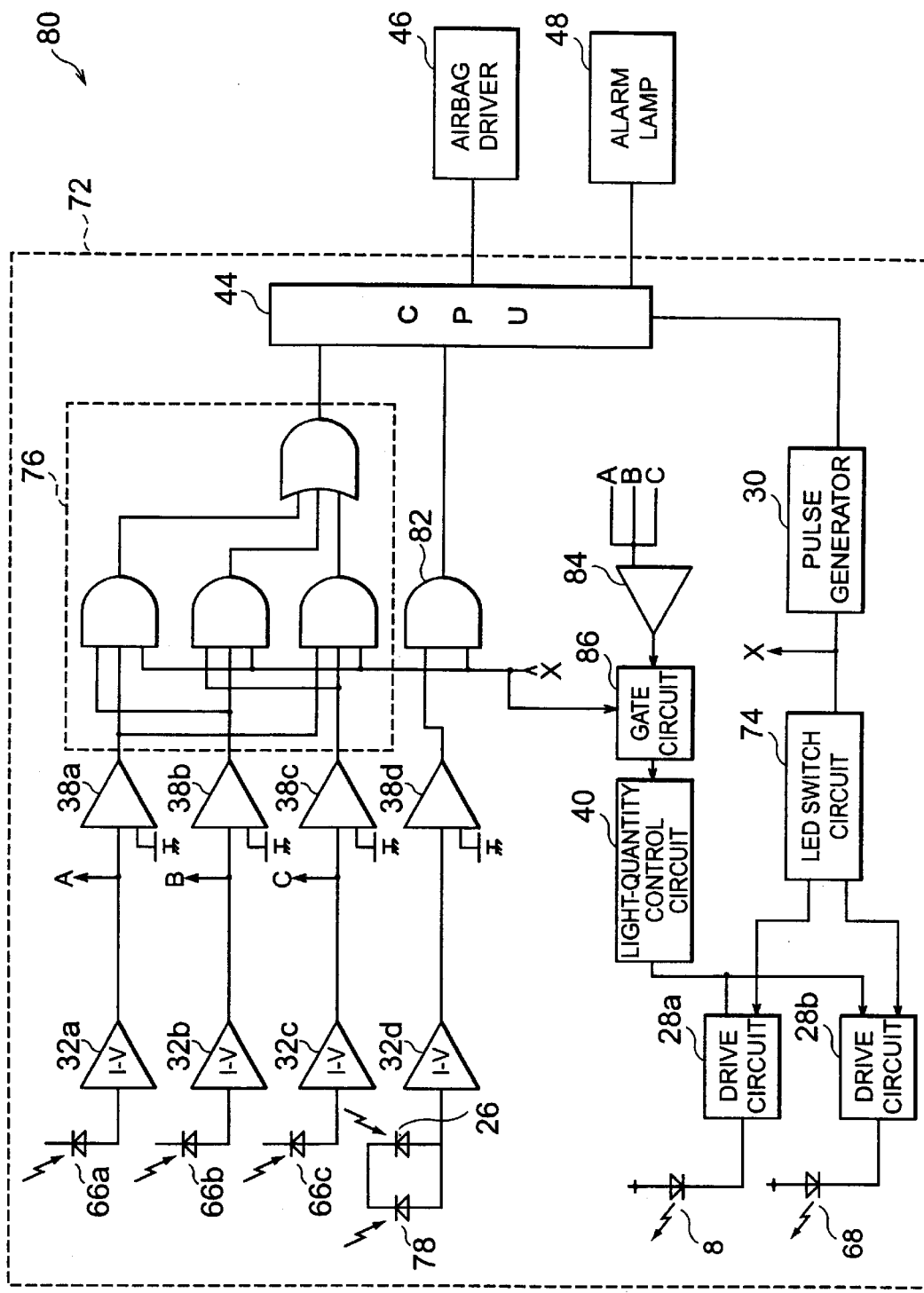
FIG. 10 is a diagram to show an electronic circuit in the occupant sensor and the airbag control apparatus of the fourth embodiment.

The fourth embodiment of the present invention will be next described referring to FIG. 9 and FIG. 10. FIG. 9 is a side view of the occupant sensor 72 of the present embodiment.

The occupant sensor 72 of the present embodiment is characterized by further comprising an LED (second light projecting portion) 68 for emitting low directional light L of an approximately conical shape with a wider spread angle (an angle in the longitudinal direction of the vehicle herein), i.e., with lower directivity than the 2D light, in addition to the occupant sensor 62 of the third embodiment.

First, the schematic structure of the occupant sensor 72 will be described. The LED 68 is placed between the cylindrical lens 18 and the condenser lens 20 attached to the cover 22 covering the base portion 16. The inclination of the LED 68 and the apical angle θL of the low directional light L are set so that the low directional light L includes the 2D area P. Further, the cover 22 is provided with a monitoring PD 78 for monitoring emission of the LED 68.

The LED 68 of the present embodiment exhibits its effect under the following circumstances. For example, when the upper part of the 2D area P is set so as to be located in the space close to the ceiling portion 6 of the car and when an object X exists in the upper part of the 2D area P, the reflection R of the 2D light projected from the light projecting portion 10 can fail to reach the condenser lens 20 in certain cases. Under such circumstances, the airbag will not be brought into the disabled state of expansion in spite of the existence of the object in the 2D area P.

In the present embodiment, however, not only the 2D light but also the low directional light L illuminates the 2D area P. Since the low directional light L has the lower directivity than the 2D light, the reflection RL of the low directional light L from the object X present in the upper part of the 2D area P enters the condenser lens 20 and the entrance port 24 more easily than the reflection R. This enables the object existing in the 2D area P to be detected even if the 2D area P is in the space relatively close to the light projecting portion 10.

The apical angle θL needs to be set to an angle at which, for example, when the low directional light L is reflected by the occupant normally seated on the seat, the reflection RL at this time is not incident to the entrance port 24.

Next, the structure of the occupant sensor 72 and the airbag control apparatus 80 will be described in more detail with reference to FIG. 10.

FIG. 10 is a diagram to show an electronic circuit in the occupant sensor 72 and the airbag control apparatus 80 of the present embodiment. The airbag control apparatus 80 is composed of the occupant sensor 72 and the airbag driving circuit 46. As shown in this circuit, a drive circuit 28a for sending an emission command to the LED 8 is connected to the LED 8 and a drive circuit 28b for sending an emission command to the LED 68 is connected to the LED 68. Further, connected to the drive circuit 28a and to the drive circuit 28b is an LED switching circuit 74 for alternately sending a drive command to the drive circuit 28a and to the drive circuit 28b in synchronism with the pulse signal from the pulse generator 30.

Current-voltage converters 32a to 32c and comparators 38a to 38c are connected in the order named to the respective photodiodes 66a to 66c and each comparator 38a to 38c is connected to a logic operation unit 76 incorporating AND gates and an OR gate. The logic operation unit 76 outputs a high-level signal to the CPU 44 when it determines that two or more output signals out of the signals from the comparators 38a to 38c are high-level signals with reception of the pulse signal from the pulse generator 30, i.e., with reception of the high-level signal.

Receiving the high-level signal from the logic operation unit 76, the CPU 44 sends an expansion inhibition command to the airbag driving circuit 46.

Connected in the order named below to the monitoring PD 26 and to the monitoring PD 78 are a current-voltage converting circuit 32d for converting their current value into a voltage value, a comparator 38d for comparing the voltage value with a reference voltage, and an AND gate 82 for outputting a high-level signal when the signal from the comparator 38d and the signal from the pulse generator 30 both are of the high level, The AND gate 82 is connected to the aforementioned CPU 44. Without receiving the high-level signal from the AND gate 82, the CPU 44 judges that the pulse generator 30, the drive circuit 28a or 28b, the LED 8 or 68, or the like suffered failure, and then lights the alarm lamp 48.

The output signals A, B, C from the current-voltage converters 32a to 32c are added up by an adder 84 to be connected through a gate circuit 86, which becomes open only upon reception of the pulse signal from the pulse generator 30, to the light-intensity control circuit 40. The light-intensity control circuit 40 sends a control signal to the drive circuits 28a, 28b in accordance with the output from the adder 84, thereby controlling the intensity of emission of the LED 8 and the LED 68.

The above described the setup of the electronic circuit in the occupant sensor 72 and the airbag control apparatus 8) of the present embodiment. In this structure, when the CPU 44 sends a drive command to the pulse generator 30, the pulse generator 30 sends the pulse signal to the LED switching circuit 74. Then the LED switching circuit 74 alternately selects either the drive circuit 28a or the drive circuit 28b to light the LED 8 or the LED 68 on the selected side.

For example, when the LED 8 is selected, whether an object exists in the 2D area P is determined based on the 2D light emitted from the LED 8. For example, when there exists an object only in the lower region of the small area Pa and the small area Pb (see FIG. 7) of the 2D area P, the reflection R is incident to the photodiodes 66a, 66b. When determining that photocurrents over a predetermined level (the reference voltage) flowed in the two photodiodes in this way, the logic operation unit 76 outputs the high-level signal to the CPU 44 and then the CPU 44 sends the airbag expansion inhibition command to the airbag driving circuit 46.

When the object exists in only one small area of the 2D area P, the logic operation unit 76 does not output the high-level signal to the CPU 44.

On the other hand, when the object X exists only in the upper region of the 2D area P, as illustrated in FIG. 9, the reflection R from the object X can fail to enter the entrance port 24 of the photodetective portion 14 in certain cases.

However, the low directional light L, which is projected from the LED 68 when the LED switching circuit 74 selects the drive circuit 28b, has the lower directivity than the 2D light, and thus the reflection RL of the low directional light L reflected by the object x existing in the upper part of the 2D area P is able to enter the entrance port 24. This permits the sensor to detect the object existing in the 2D area P even if the 2D area P is present in the space relatively close to the light projecting portion 10, as described above.

Just as in the case where the LED 8 outputs the 2D light, when the LED 68 emits the low directional light L, the reflection RL passing through the entrance port 24 is incident to two or more photodiodes 66a to 66c, whereby the CPU 44 outputs the expansion inhibition command to the airbag driving circuit 46.

The above specifically described the invention accomplished by the inventor, based on the embodiments thereof, but it is noted that the present invention is by no means limited to the above embodiments.

For example, the shape of the 2D area does not always have to be the trapezoid, but can be any other shape, such as a circle, a quadrate, or the like. In such cases, the shape of the masks can also be determined so that the reflection of the 2D light enters the entrance port only when an object exists in the 2D area.

Figure 11:
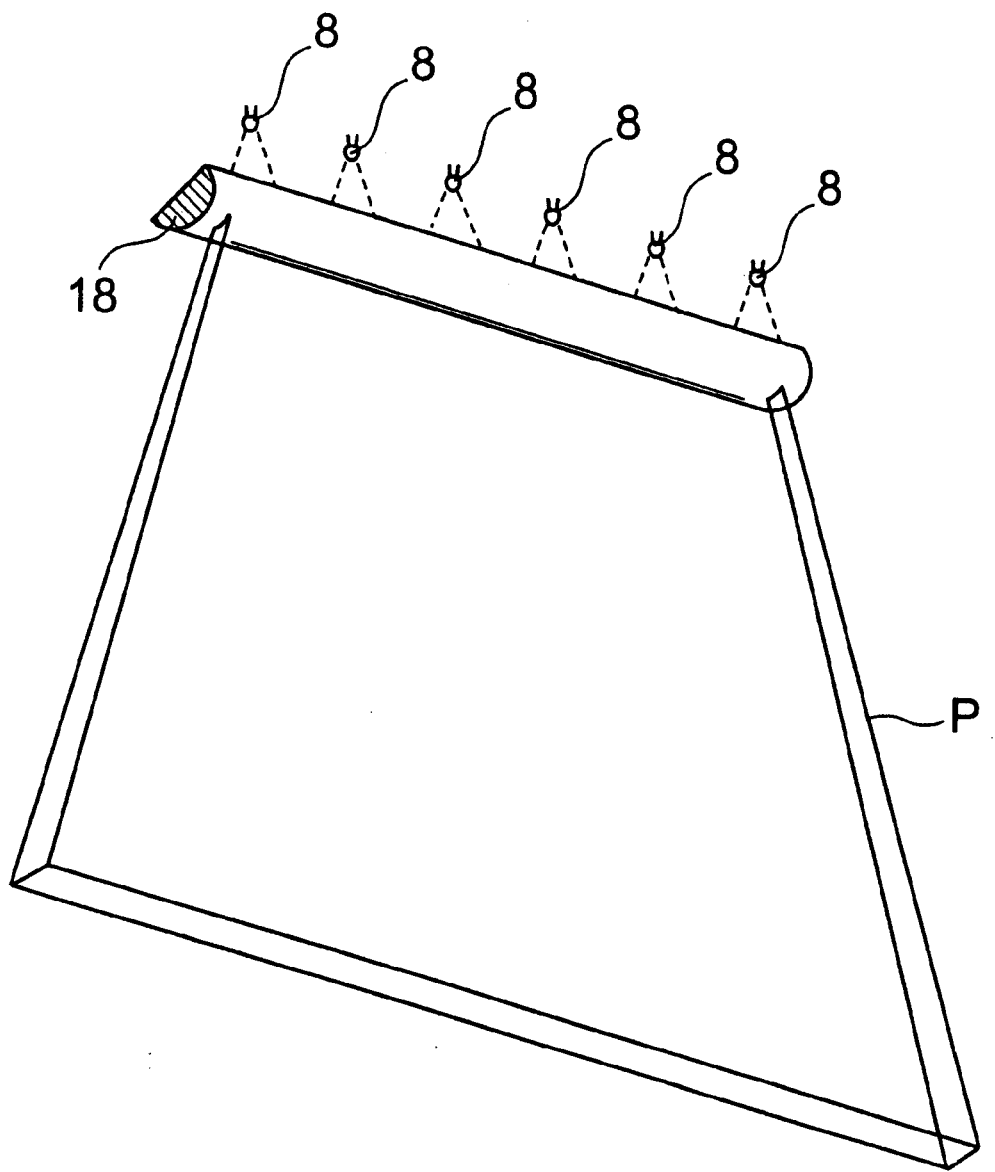
FIG. 11 is a perspective view of a light projecting portion.

The number of LED(S) 8 can be singular, but preferably plural. In the plural case, the LEDs 8 are simultaneously lighted up. FIG. 11 is a perspective view of the light projecting portion in which six LEDs 8 are arranged in line and their array direction matches with the cylinder axis of the cylindrical lens 18. The cylindrical lens 18 may be constructed so that the curvature of the surface in the central part in the axial direction is different from that of the surface at the both ends, in order to decrease aberration.

Figure 12:
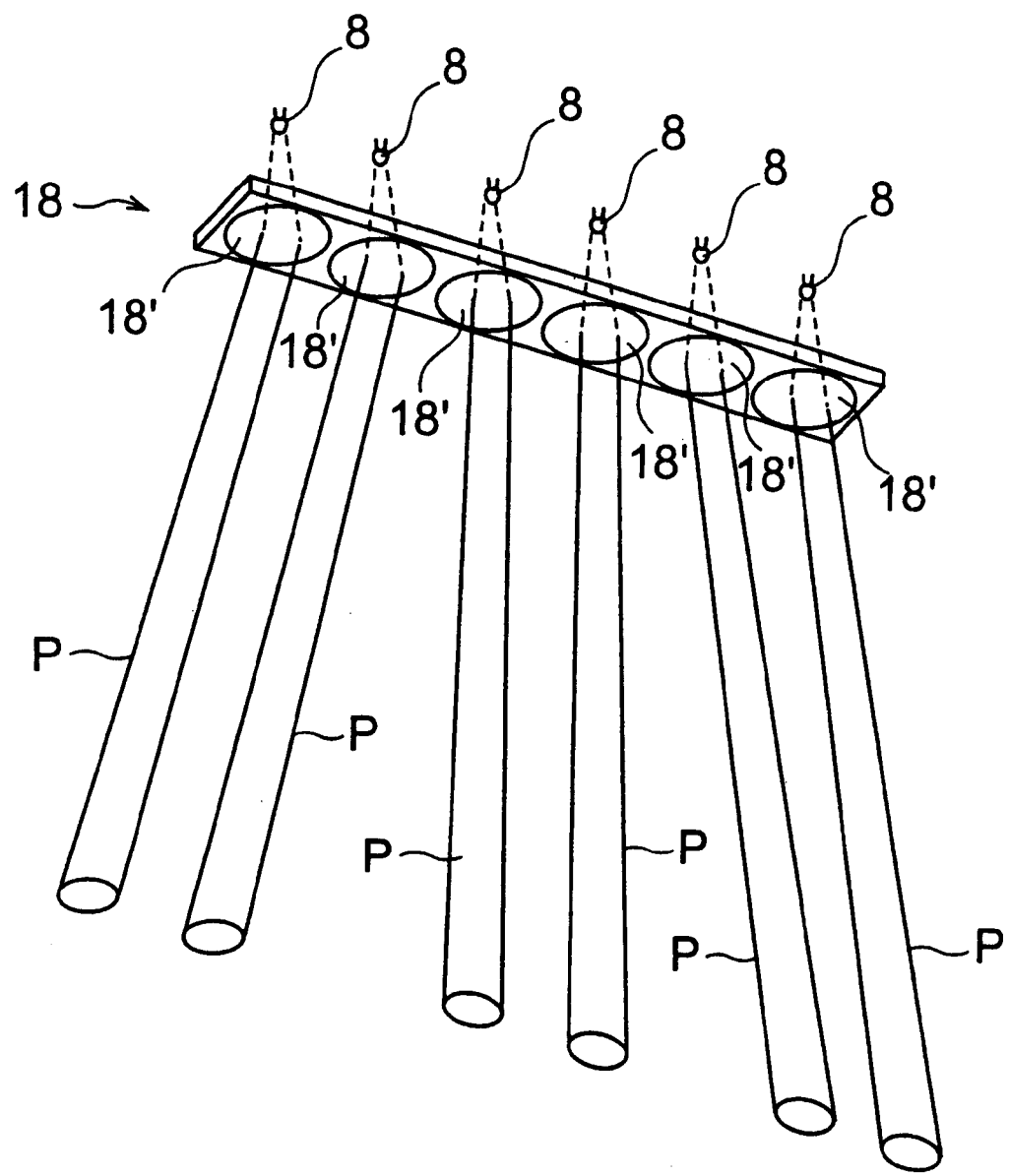
FIG. 12 is a perspective view of another light projecting portion.

The 2D light does not have to be limited to the light widened by the cylindrical lens, but it may be 2D light consisting of an array of beams. FIG. 12 is a perspective view of the light projecting portion in which a plurality of aspherical lenses 18' are arranged corresponding to respective LEDs 8. The plurality of aspherical lenses 18' may be arranged individually and independently of each other, but the present example shows an example in which they are formed in one rod shape by integral molding of resin.

Beams emitted from the respective LEDs 8 can be parallel to each other, but they are emitted in radial directions in the present example. Each LED 8 emits a beam in which the central part around the optical axis exhibits high luminance and is surrounded by light with intensity approximately equal to one fifth of that in the central part. The beams adjacent to each other are independent of each other, but the light in the peripheral part preferably overlaps with each other. The individual beams may be perfectly isolated from each other as long as they are emitted in the slit shape as a whole. The 2D light (light curtain) embraces the beam from the light projecting portion 10 in all the states described above and the thickness of the light curtain is within ±10% of the irradiation distance.

A wavelength selecting filter for letting only the wavelength of the 2D light pass may also be placed in front of the condenser lens for condensing the reflection of the 2D light. In this case, noise is prevented from entering the photodetective portion.

Further, the mounting position of the occupant sensor is not limited to the ceiling portion of the car, but the sensor can be installed at a variety of positions. For example, the sensor may be mounted on a pillar or the like.

As described above, the occupant sensors of the present invention are constructed in such structure that when the 2D light emitted from the light projecting portion reaches an object, the reflection of the 2D light reflected by the object travels toward the photodetective portion.

The 2D light is emitted so as to include the 2D area in the spread directions of the predetermined 2D area of the airbag expanding region. The reflection is incident to the entrance port of the mask covering the photosensitive surface of the photodetective portion only when the object exists in the 2D area. For this reason, the photodetective portion detects the reflection only when the occupant or the like exists in the watching area. Therefore, the sensor does not have to make a judgment on presence/absence of object in the region causing no influence on the expanding operation of the airbag.

Since the light projected from the light projecting portion is the 2D light having the predetermined spread in the width direction or the 2D light consisting of the array of beams, the existence of object can be quickly detected, then compared with the case wherein a plurality of light projecting means are provided to sequentially project beams. Since the existence of object in the 2D area can be detected simply by entry of the reflection of the 2D light into the entrance port of the mask, the judgment on presence/absence of object can be readily made.

The apparatus of the invention can detect the existence of object by use of the photodiode as the photodetective portion, but it is also possible to apply a PSD to the photodetective portion if the production cost is not a matter of concern.

What is claimed is:

1. An occupant sensor for detecting existence of an object in a vehicle, comprising:
    a first light projecting portion for forming a light curtain in the vehicle;
    a photodetective portion having a photosensitive surface capable of receiving a reflection of said light curtain;
    a mask covering at least a portion of said photosensitive surface and having an entrance port which light can enter, wherein said mask covers said photosensitive surface so that only when an object exists in a two-dimensional area defined by said light curtain, can said reflection from said object enter said entrance port; and
    a second light projecting portion for projecting low directional light with lower directivity than said light curtain formed by said first light projecting portion, wherein only when an object exists in said two-dimensional area, will said low directional light reflected by the object enter said entrance port.

2. An occupant sensor according to claim 1, wherein said mask comprises a shield film comprised of aluminum.

3. An occupant sensor according to claim 1, wherein said first light projecting portion comprises a cylindrical lens arranged in a pathway of light projected from said first light projecting portion.

4. An occupant sensor according to claim 1, wherein said first light projecting portion has a plurality of LEDs, and wherein said LEDs can be simultaneously lit up.

5. An occupant sensor according to claim 1, wherein said first light projecting portion forms a plurality of light curtains.

6. An occupant sensor according to claim 1, wherein said photodetective portion has plurality of photosensitive surfaces arrayed in a direction of the width of said light curtain.

7. An airbag control apparatus for controlling an airbag, comprising:
    the occupant sensor as set forth in claim 1; and
    a control section for bringing the airbag into a disabled state of expansion when said reflection enters the entrance port.

8. An occupant sensor according to claim 1, wherein said first light projecting portion forms a substantially vertical light curtain between a seat and an airbag housing of the vehicle.

9. An occupant sensor according to claim 1, wherein said photosensitive surface of said photodetective portion is configured to receive a substantially vertical reflection of said light curtain reflected by an occupant of the vehicle.

* * * * *